US009345110B2

(12) United States Patent  
Miller (10) Patent No.: US 9,345,110 B2  
(45) Date of Patent: May 17, 2016

(54) MOTION ACTUATED FIXTURE ILLUMINATOR

(76) Inventor: Jack D. Miller, Boynton Beach, FL (US)

( * ) Notice: Subject to any disclaimer, the term of this patent is extended or adjusted under 35 U.S.C. 154(b) by 1075 days.

(21) Appl. No.: 13/421,082

(22) Filed: Mar. 15, 2012

(65) Prior Publication Data

US 2012/0235578 A1 Sep. 20, 2012

Related U.S. Application Data

(60) Provisional application No. 61/452,909, filed on Mar. 15, 2011.

(51) Int. Cl.
H05B 37/02 (2006.01)

(52) U.S. Cl.
CPC ............. H05B 37/0227 (2013.01); *Y02B 20/44* (2013.01)

(58) Field of Classification Search
None
See application file for complete search history.

(56) References Cited

U.S. PATENT DOCUMENTS

| | | |
|---|---|---|
| 3,982,288 A | 9/1976 | Borne |
| 4,088,445 A | 5/1978 | Ellis |
| 4,413,364 A | 11/1983 | Bittaker et al. |
| 4,733,419 A | 3/1988 | Nee |
| 4,736,471 A | 4/1988 | Johnson |
| 4,860,178 A | 8/1989 | Picon |
| 5,003,648 A | 4/1991 | Anderson |
| 5,036,443 A | 7/1991 | Humble et al. |
| 5,136,476 A * | 8/1992 | Horn .............................. 362/198 |
| 5,263,209 A | 11/1993 | Pattee |
| 5,276,595 A | 1/1994 | Patrie |
| 5,307,051 A | 4/1994 | Sedlmayr |
| 5,384,917 A | 1/1995 | Epling |
| 5,437,066 A | 8/1995 | Mills et al. |
| D363,998 S | 11/1995 | DeLillo et al. |
| 5,499,008 A | 3/1996 | Rosenkrantz et al. |
| D375,346 S | 11/1996 | Garcia |
| 5,611,089 A | 3/1997 | Cretors |
| 5,664,867 A | 9/1997 | Martin et al. |
| 5,763,872 A | 6/1998 | Ness |
| 5,926,867 A | 7/1999 | Buchanan |
| 5,946,209 A * | 8/1999 | Eckel et al. ..................... 700/14 |
| 6,170,968 B1 * | 1/2001 | Caswell ......................... 362/469 |
| 6,203,164 B1 | 3/2001 | Tufekci et al. |
| 6,231,203 B1 | 5/2001 | Olshausen |
| 7,036,158 B2 | 5/2006 | Bradford et al. |
| 7,267,460 B2 | 9/2007 | Lefferson |
| 7,405,524 B2 | 7/2008 | Null et al. |
| 7,411,174 B2 | 8/2008 | Eash |
| 7,434,960 B2 | 10/2008 | Stuhlmacher, II et al. |

(Continued)

*Primary Examiner* — Cassandra Cox
(74) *Attorney, Agent, or Firm* — Nancy J. Flint, Esq.; Nancy J. Flint, Attorney At Law, P.A.

(57) ABSTRACT

A motion detecting device that, upon sensing motion, actuates an eclectic variety of illuminations to a proximal area of a fixture for providing functional and aesthetic benefits. The sensitivity of the motion detecting device is adjustable, and once actuated, powers on at least one light stream and or sound emanation device. Each light stream is positioned to illuminate a specific area on the fixture, or in proximity to the fixture. In various embodiments, the resultant illumination allows a user to better proximate the distance from a toilet seat, the perimeter of a toilet, the quantity and direction of water dispensing from a sink, and other similar uses. The motion detecting device may further include a light sensor to prevent illumination when light is detected, and a timer to turn off the illumination device after it has been activated for a predetermined amount of time.

14 Claims, 4 Drawing Sheets

(56) References Cited

U.S. PATENT DOCUMENTS

| | | |
|---|---|---|
| 7,503,081 B2 | 3/2009 | Montgomery |
| 7,585,092 B2 | 9/2009 | Huffman |
| 7,741,597 B2 | 6/2010 | Jensen et al. |
| 9,041,298 B2 * | 5/2015 | Andy et al. .................. 315/159 |
| 2001/0037520 A1 | 11/2001 | Farzanehfar |
| 2004/0184273 A1 | 9/2004 | Reynolds et al. |
| 2007/0256224 A1 | 11/2007 | Olshausen |
| 2008/0266844 A1 | 10/2008 | Reynolds et al. |
| 2008/0304289 A1 | 12/2008 | Chien |
| 2010/0095443 A1 | 4/2010 | Nishimura et al. |
| 2012/0017367 A1 * | 1/2012 | Reeder et al. ..................... 4/597 |
| 2012/0068613 A1 * | 3/2012 | Veneto .......................... 315/159 |
| 2012/0206050 A1 * | 8/2012 | Spero ........................... 315/152 |

\* cited by examiner

MOTION ACTUATED FIXTURE ILLUMINATOR

RELATED APPLICATION

This application claims the benefit of the filing date of U.S. Provisional Patent Application Ser. No. 61/452,909, filed on Mar. 15, 2011 and titled Motion-Activated, Light Sensitive Toilet Bowl Illuminator With Changeable, Disposable Flexible Light Stream, the contents of which are hereby incorporated by reference in their entirety.

FIELD OF THE INVENTION

The present invention relates generally to a motion actuated fixture illuminator. More so, the motion actuated fixture illuminator provides a motion detecting device that, upon sensing motion, actuates an eclectic variety of illuminations to a proximal area of a plumbing fixture for providing functional and aesthetic benefits.

BACKGROUND OF THE INVENTION

Motion detection is a process of confirming a change in position of an object relative to its surroundings or the change in the surroundings relative to an object. This detection can be achieved by both mechanical and electronic methods. In addition to discrete, on or off motion detection, it can also consist of magnitude detection that can measure and quantify the strength or speed of this motion or the object that created it. Motion can be detected by: sound (acoustic sensors), opacity (optical and infrared sensors and video image processors), geomagnetism (magnetic sensors, magnetometers), reflection of transmitted energy (infrared laser radar, ultrasonic sensors, and microwave radar sensors), electromagnetic induction (inductive-loop detectors), and vibration (triboelectric, seismic, and inertia-switch sensors). Further, acoustic sensors are based on: electret effect, inductive coupling, capacitive coupling, triboelectric effect, piezoelectric effect, and fiber optic transmission. Radar intrusion sensors have the lowest rate of false alarms.

Motion sensors have been utilized in numerous rooms and buildings, including the following:
  It is common for stores to have a beam of light crossing the room near the door, and a photosensor on the other side of the room. When a customer breaks the beam, the photosensor detects the change in the amount of light and rings a bell.
  Many grocery stores have automatic door openers that use a very simple form of radar to detect when someone passes near the door. The box above the door sends out a burst of microwave radio energy and waits for the reflected energy to bounce back. When a person moves into the field of microwave energy, it changes the amount of reflected energy or the time it takes for the reflection to arrive, and the box opens the door. Since these devices use radar, they often set off radar detectors.
  The same thing can be done with ultrasonic sound waves, bouncing them off a target and waiting for the echo.

All of these are active sensors. They inject energy (light, microwaves or sound) into the environment in order to detect a change of some sort. The "motion sensing" feature on most lights and security systems in houses is a passive system that detects infrared energy. In order to make a sensor that can detect a human being, the sensor must be sensitive to the temperature of a human body. Humans, having a skin temperature of about 93 degrees F., radiate infrared energy with a wavelength between 9 and 10 micrometers. Therefore, the sensors are typically sensitive in the range of 8 to 12 micrometers.

The design of a bathroom, and its corresponding plumbing fixtures, must account for the use of both hot and cold water, in significant quantities, for cleaning the human body. From a decorating point of view the bathroom presents a challenge. Ceiling, wall, plumbing fixtures, and floor materials and coverings should be impervious to water and readily and easily cleaned. The use of ceramic or glass, as well as smooth plastic materials, is common in bathrooms for their ease of cleaning Such surfaces are often cold to the touch, however, and so water-resistant bath mats or even bathroom carpets may be used on the floor to make the room more comfortable.

Bathroom lighting should be uniform, bright and must minimize glare, especially in proximity to sinks, mirrors, toilets, urinals, and showers. For all the activities like shaving, showering, grooming etc. one must ensure equitable lighting across the entire bathroom space. The toilet should provide illumination for judging proximity to the perimeter of the toilet seat. The mirror area should definitely have at least two sources of light at least 1 feet apart to eliminate any shadows on the face. An undesirable effect of poor lighting causes skin tones and hair color are highlighted with a tinge of yellow. Actuating functional or aesthetic lighting in proximity to these plumbing fixtures is not always obvious.

U.S. Pat. No. 5,136,476 to Horn and titled Toilet Bowl Illuminator discloses a portable illuminator for illuminating toilet bowls. The disclosed illuminator hangs on the rim of a toilet bowl and a battery pack or other external power source carries current to a light source suspended within the bowl. Light sensitive and manual switches and current-regulating circuitry are options for the disclosed illuminator. The illuminator provides continuous illumination of provide guidance to a toilet bowl in an otherwise darkened room.

Even though the above cited bathroom fixtures and motion detectors meet some of the needs of the market, a device for actuating a light source on a proximal area of a bathroom fixture is still desired.

SUMMARY OF THE INVENTION

This invention is directed to a motion actuated fixture illuminator that provides a motion detecting device that, upon sensing motion, actuates an eclectic variety of illuminations to a proximal area of a fixture for providing functional and aesthetic benefits. The motion actuated plumbing actuator detects a user through a variety of detecting means including, but not limited to: physical changes in light, sound, opacity, geomagnetism, reflection of transmitted energy, electromagnetic induction, and vibration. The sensitivity of the motion detecting device is adjustable, and once actuated, powers on at least one light stream. Each light stream is positioned to illuminate a specific area on the fixture, or in proximity to the fixture. The illumination provides both functional and aesthetic benefits to the user. The motion detecting device and the light stream are both easily moved for cleaning and installation for illumination of a variety of fixtures and non-fixtures, such as hallways, stairs and floors.

A first aspect of the present invention provides a motion actuated fixture illuminator comprising:
  a motion detecting device for detecting motion from a user, the motion detecting device comprising a housing, the housing comprising a detection surface, the detection surface comprising at least one lens, the housing further comprising a mounting surface, the housing further comprising a sensory control member for detecting motion, the housing further comprising at least one switch member, the housing further comprising at least one socket member, the housing further comprising at least one power source; and at least one light stream operatively connected to the motion detecting device for illuminating a proximal area of a fixture, wherein upon sensing a user, the motion detecting device actuates the light stream.

In a second aspect, the motion actuated fixture illuminator provides illumination in proximity to, or inside a toilet, urinal, shower, sink, water fountain, or any bathroom or plumbing fixture now known or later developed.

In another aspect of the motion actuated fixture illuminator, the light stream is a thin, flexible housing that holds an LED light or other type of illuminating device now known or later developed, and can be manipulated and positioned to generate a variety of lighting angles, patterns and intensities.

In yet another aspect, the light stream allows for customizations of the light, such as color, intensity, and/or pattern changes; while additional female socket members mounted on the housing allow illumination of multiple areas in proximity to the fixture.

In another aspect of the motion actuated fixture illuminator, the sensory control member includes a circuit board containing a variety of motion sensing related component electronics that consist of but are not limited to the following: motion sensor, light sensor, micro-processor, resistors, and capacitors.

In another aspect of the motion actuated fixture illuminator, the sensory control member measures infrared radiation from the user, and is made of a crystalline material that generates a surface electric charge when exposed to heat in the form of infrared radiation; thereby when the amount of radiation striking the crystalline material changes, the amount of charge on the associated circuitry also changes to create an electrical impulse for actuating the light stream.

In another aspect of the motion actuated fixture illuminator, the motion detecting device is a passive system that detects infrared energy. The sensory control member is a passive infrared detectors or pyroelectric sensor. Whereby, in order to detect the user in proximity to the plumbing fixture, the sensory control member must be sensitive to the temperature of a human body, about 93 degrees Fahrenheit, and a wavelength between 9 and 10 micrometers.

In another aspect of the motion actuated fixture illuminator, the light stream operatively attaches to the motion detecting device though a waterproof wire, whereby the at least one socket member is a female socket mounted on the housing and connected to the sensory control member through copper or other metals having low electrical resistance, and at least one male provider on the wire plug into the female socket member allowing current to safely flow through the wire portion of the light stream for illuminating the plumbing fixture or proximate area.

In another aspect, the power source is a direct current energy or charge storage device that can include any battery or cell known in the field, including general purpose batteries, alkaline batteries, lithium ion batteries, nickel-cadmium batteries, rechargeable batteries, or any other battery device that is configured to provide power to the illuminator, with a preferable voltage of 3-12 volts.

In yet another aspect, in operation, the user identifies a desired fixture, or an area in proximity of the fixture, for adding additional illumination. The power source is checked to verify functionality. However, in other embodiments, the power source is external to the motion actuated fixture illuminator. The motion detecting device is then positioned in proximity to the plumbing fixture. The mounting surface of the housing is affixed to or loosely placed nearby a proximal surface area. Adhesives, screws, sleeves, brackets and bolts, or fasteners of similar extrusion could be employed for this. In the embodiment depicted in FIG. 1, the motion detecting device is oriented behind a toilet so that when the user stands next to or squats onto the toilet, or enters the room or space that is to be illuminated, the at least one lens detects motion from the user's presence, causing the light stream to actuate. The motion detecting device is then operatively mated to the light stream by mating a wire from the light stream into the at least one socket member of the housing. The user can employ other methods to connect the light stream into the at least one socket member of the housing, including a wireless connection. However, the invention is not intended to be limited to this embodiment. The light stream, which in one embodiment is a flexible LED light, is then manipulated around an edge of the toilet bowl seat to maximize a desirable illumination for the interior of the toilet. However, in further embodiments, multiple light streams can be positioned in proximity to the toilet, creating an eclectic variety of aesthetic and functional lighting. In one embodiment, the sensory control member utilizes infrared radiation to detect the user's motion. The user can also employ other types of motion detecting devices and methods such as: physical changes in light, sound, opacity, geomagnetism, reflection of transmitted energy, electromagnetic induction, vibration, or any other motion detecting method now known or later developed. The user then wipes off the at least one lens to allow for maximum efficiency for the infrared radiation transmission and readings. The user then tests the motion detecting device to verify that it actuates the light stream upon sensing motion.

In one aspect of the invention, the motion detecting device comprises a speaker and a sound player with memory under control of the sensory control member such that sound files can be downloaded to its memory via Bluetooth®, WiFi™ or other music downloading capabilities, allowing the user's experience to be enhanced by the playing of music or other sounds while in the vicinity of the motion detecting device. In one aspect of the invention, the motion detecting device can be remotely programmed to be turned on or off; to program the timing of the illumination of the light stream; to program the colors or patterns; or to play music or other sounds upon detection of the presence of a person via Bluetooth®, WiFi™ or mobile phone applications now known or later developed.

One benefit of the motion actuated fixture illuminator is that it illuminates a softly colored focused illumination in proximity to the plumbing fixture, and emits sufficient light to allow for facilitated navigation and use near or about the plumbing fixture area.

Another benefit is that the motion actuated fixture illuminator provides illumination and safety while using less power than conventional night lights.

In yet another benefit, the motion actuated fixture illuminator is portable, adjustable, and capable of utilizing a variety of existing and yet to be built flexible light streams and other illumination sources.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A motion actuated fixture illuminator 100 is described in FIGS. 1 through 4. Motion actuated fixture illuminator 100 is an assembly comprising: a motion detecting device 110 for detecting motion from a user. Motion detecting device 110 detects motion from the user in proximity to a plumbing fixture 200. Motion detection can be achieved by both mechanical and electronic methods. In addition to discrete, on or off motion detection, motion detection can also consist of magnitude detection that can measure and quantify the strength or speed of this motion or the object that created it. Further, motion can be detected by: sound (acoustic sensors), opacity (optical and infrared sensors and video image processors), geomagnetism (magnetic sensors, magnetometers), reflection of transmitted energy (infrared laser radar, ultrasonic sensors, and microwave radar sensors), electromagnetic induction (inductive-loop detectors), vibration (triboelectric, seismic, and inertia-switch sensors), and any other motion detecting technology now known or later developed.

Those skilled in the art can appreciate that motion, in the sense of this invention, can include sound waves whereby acoustic detecting devices can be utilized. Acoustic sensors are based on: electret effect, inductive coupling, capacitive coupling, triboelectric effect, piezoelectric effect, and fiber optic transmission.

Motion detecting device 110 includes a housing 120 that provides a protection for the variety of sensitive electronic and scientific elements that make up motion detecting device 110. Housing includes a detection surface 130, which orients towards the most likely location of the user's entry area into the room or space. Detection surface 130 includes at least one lens 132. Lens 132 serves to provide a transparent surface for light, radiation, laser beams, and other forms of energy pertinent to motion or light detecting to pass through. In further embodiments, lens 132 can also serve as a camera for emitting and receiving infrared radiation, or a vibrating member for detecting sound waves.

A different surface area of housing 120 includes a mounting surface 140. Mounting surface 140 is affixed to a surface area proximal to plumbing fixture 200. Adhesives, screws, brackets and bolts, or fasteners of similar extrusion could be employed for this.

The top surface of housing 120 may further include sensory control member 150 for detecting motion. In the embodiment depicted in FIG. 1, motion detecting device 110 is oriented behind a toilet so that when the user stands next to or squats onto the toilet, sensory control member 150 detects motion from the user's leg or thigh.

In one embodiment, sensory control member 150 measures infrared radiation from the user, and is made of a crystalline material that generates a surface electric charge when exposed to heat in the form of infrared radiation; thereby when the amount of radiation striking the crystalline material changes, the amount of charge on the associated circuitry also changes to create an electrical impulse for actuating the illumination.

Those skilled in the art can appreciate that motion detecting device 110 that detects infrared energy is classified as a passive detector. Sensory control member 150 is a passive infrared detector or pyroelectric sensor. Whereby, in order to detect the user in proximity to plumbing fixture 200, sensory control member 150 must be sensitive to the temperature of a human body; about 93 degrees Fahrenheit, and having an infrared radiation wavelength between 9 and 10 micrometers.

Housing 120 further includes at least one switch member 160, which attaches in an area of housing 120 convenient for the user to access. In one embodiment, switch member 160 is set to automatic. Light detector 135 located inside housing 120 detects dim to dark lighting through lens 132, whereby any light detected by light detector 135 will prevent operation of light stream 190 regardless of detection of motion by motion detecting device 110. When light detector 135 determines that lighting as detected through lens 132 has fallen below a predetermined level, any movement sensed by sensory control member 150 will cause motion detecting device 110 to activate light stream 190. Switch member 160 can also adjust the sensitivity of sensory control member 150, or sensory control member 150 could be set to insure optimal performance. Illumination duration of light stream 190 could also be adjusted with switch member 160, according to preference.

Those skilled in the art can appreciate that switch member 160 can be employed to control further operations of motion detecting device 110 such as the sensitivity of the motion, the selection of lighting in a plurality, the radiant intensity or pattern variance of the illuminating light, or any other switch controlled function now known or later developed.

Housing 120 further includes at least one socket member 170. Socket member 170 is a female socket mounted on housing 120 and connected to sensory control member 150 through copper or other metals having low electrical resistance; and further requires at least one male provider on the wire to plug into socket member 170 allowing current to flow through the wire for illuminating plumbing fixture 200 or the proximal area.

Housing 120 further includes at least one power source 180. In one embodiment, power source 180 can be external to motion actuated plumbing fixture illuminator 100, whereby a power cord connects an external power source 180 to motion actuated fixture illuminator 100. In another embodiment, power source 180 is internally positioned inside motion actuated plumbing fixture illuminator and is a direct current energy or charge storage device that can include any battery or cell now known or later developed in the field including: general purpose batteries, alkaline batteries, lithium ion batteries, nickel-cadmium batteries, rechargeable batteries, or any other battery device, with a preferable voltage of 1.5-12 volts.

At least one light stream 190 operatively connects to motion detecting device 110 for illuminating plumbing fixture 200, wherein upon sensing a user, motion detecting device 110 actuates light stream 190. Light stream 190 is the functional service portion of motion actuated fixture illuminator 100. In one embodiment, light stream 190 consists of a lead wire that carries power from motion detecting device 110 to a thin, flexible housing that holds an LED light in the optimal placement zone of plumbing fixture 200. The flexible, yet semi-ridged housing of light stream 190, allows the working portion of light stream 190 to mount securely to the top of the toilet or other desired plumbing fixture 200 surfaces. In one embodiment, light stream 190 is plugged directly to socket member 170.

In further embodiments, light stream 190 illuminates a softly colored, and focused illumination inside the toilet, and emits sufficient light to allow for facilitated navigation and use near or about the toilet, whereby a user can have a better sense of the height of a toilet seat before squatting on the toilet seat, and more specifically, a male can better approximate the perimeter of the toilet while urinating. Light stream 190 further provides illumination and safety while using less power than conventional night lights.

Those skilled in the art can appreciate that light stream 190 is portable, adjustable, and capable of utilizing off the shelf light streams, including a variety of colors and patterns.

Figure 1:
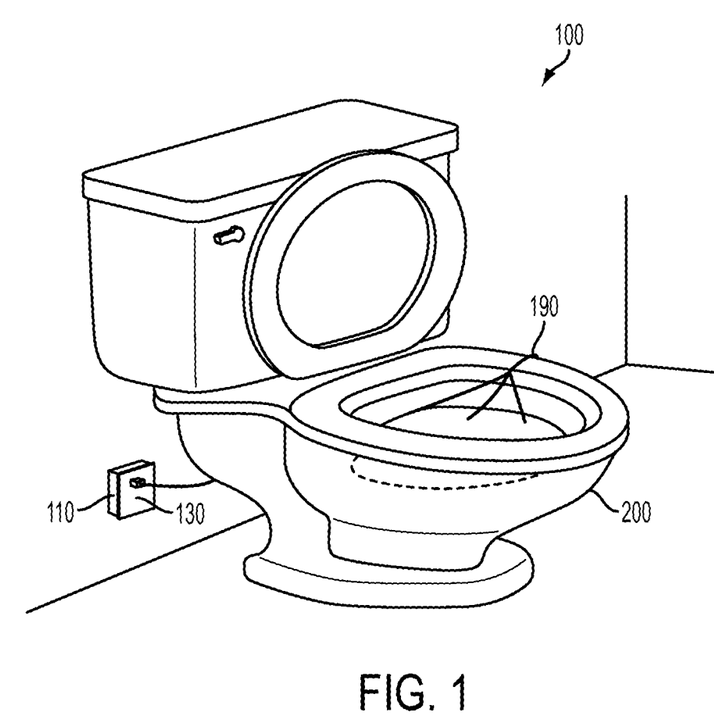
FIG. 1 presents a detailed perspective view of a plumbing fixture with a motion actuated fixture illuminator attached.
Figure 2:
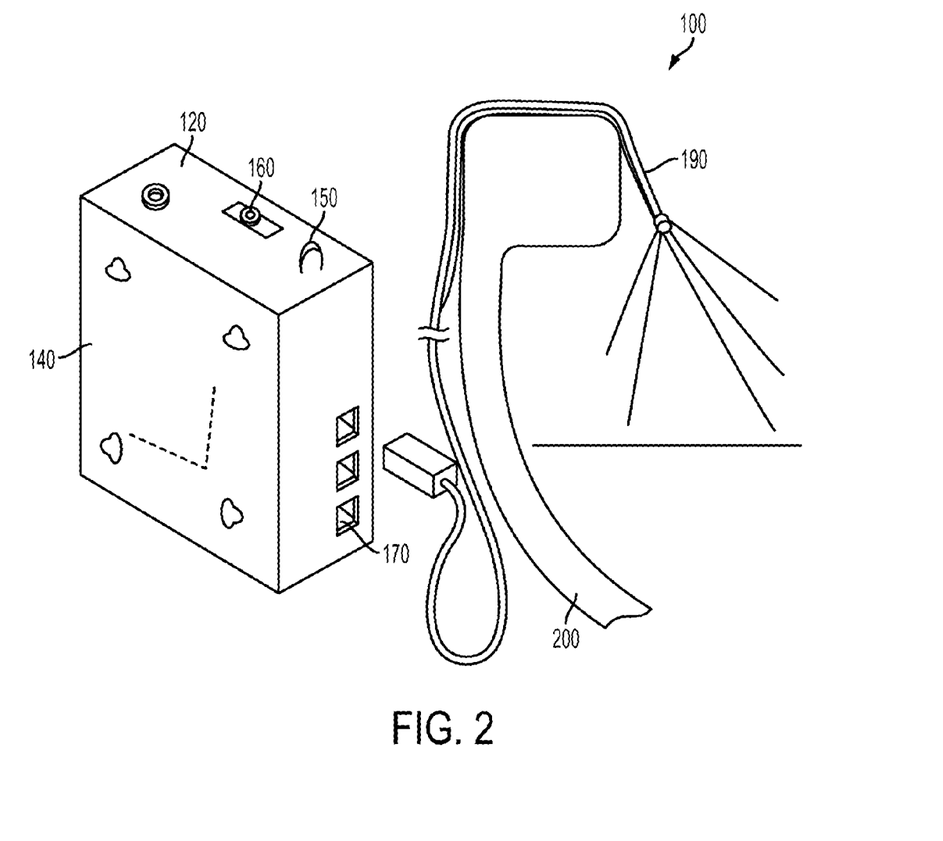
FIG. 2 presents a detailed perspective view of a motion detection device and an light stream.
Figure 3:
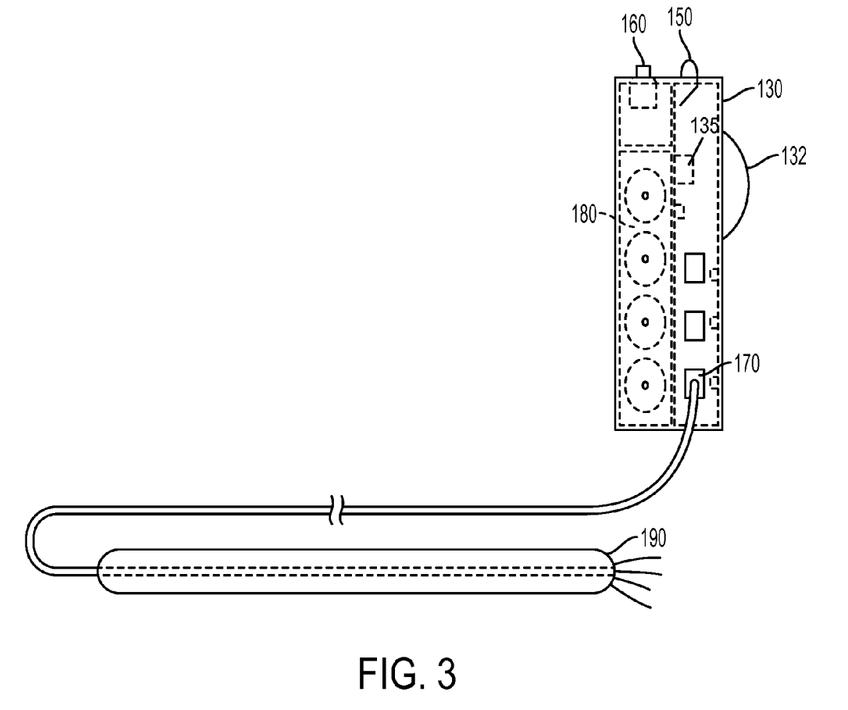
FIG. 3 presents a sectioned view of the motion detection device with an internal power source, and an light stream.
Figure 4:
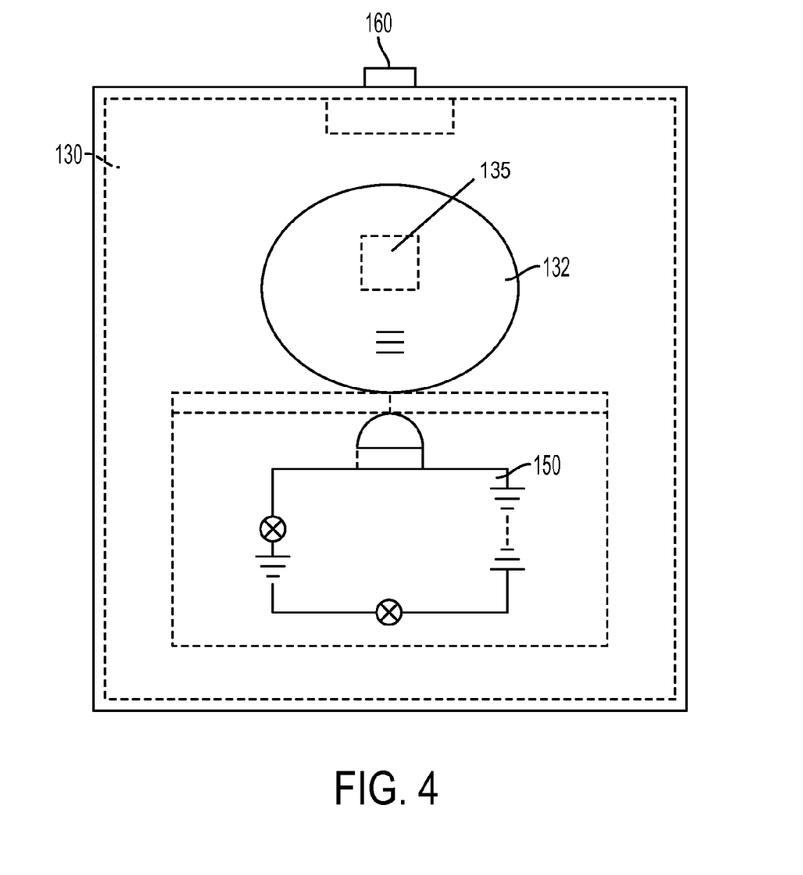
FIG. 4 presents a sectioned front view of the motion detection device with the sensory control member having a sensory circuitry and a sensory membrane.

Motion actuated fixture illuminator 100 is designed to provide an eclectic variety of light sources to a specific section of plumbing fixture 200 after the user activates motion detecting device 110, which is attached to light stream 190. Details of the installation of the exemplary motion actuated fixture illuminator 100 are illustrated in FIGS. 1 and 2. In operation, the user identifies a desired plumbing fixture 200, or an area in proximity of plumbing fixture 200, for adding additional illumination. Power source 180 is checked to verify functionality. However, in other embodiments, power source 180 is external to motion actuated plumbing fixture illuminator 100. Motion detecting device 110 is then positioned in proximity to plumbing fixture 200. The mounting surface of housing 120 is affixed to a proximal surface area. Adhesives, screws, brackets and bolts, or fasteners of similar extrusion could be employed for this purpose. In the embodiment depicted in FIG. 1, motion detecting device 110 is oriented behind the toilet so that when the user stands next to or squats onto the toilet, lens 132 and/or sensory control member 150 detects motion from the user's leg or thigh, causing light stream 190 to actuate. In one embodiment, motion detecting device 110 is positioned to respond to movement anywhere within a room or other space. Motion detecting device 110 is then operatively mated to light stream 190 by mating a wire from light stream 190 into socket member 170 in housing 120. The user can employ other methods to connect light stream 190 into socket member 170, including a wireless connection. However, the invention is not intended to be limited to this embodiment. Light stream 190, which in one embodiment is a flexible LED light, is then manipulated around an edge of the toilet bowl seat or any other portion of the plumbing fixture to maximize a desirable illumination for the interior of the toilet or other fixture. In one embodiment, light stream 190 can be positioned near-by or on other portions of toilet or other fixture. In further embodiments, multiple light streams 190 can be positioned in proximity to the toilet, creating an eclectic variety of aesthetic and functional lighting. In one embodiment, sensory control member 150 utilizes infrared radiation to detect the user's motion. The user can also employ other types of motion detecting devices 110 and methods such as: physical changes in light, sound, opacity, geomagnetism, reflection of transmitted energy, electromagnetic induction, vibration, or any other motion detecting device 110 or method now known or later developed. The user then wipes off lens 132 to allow for maximum efficiency for the infrared radiation transmission and readings. The user then tests motion detecting device 110 to verify that it actuates light stream 190 upon sensing motion.

In one embodiment, motion detecting device 110 may comprise a speaker and a sound player with memory under control of the sensory control member such that sound files can be downloaded to its memory via Bluetooth®, WiFi™ or other music downloading capabilities, allowing the user's experience to be enhanced by the playing of music or other sounds while in the vicinity of motion detecting device 110. In one embodiment, motion detecting device 110 can be remotely programmed to be turned on or off; to program the timing of the illumination of the light stream; to program the colors or patterns; or to play music or other sounds upon detection of the presence of a person via Bluetooth®, WiFi™ or mobile phone applications now known or later developed.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A motion actuated fixture illuminator configured to control the illumination of a proximal area of a plumbing fixture after a user is detected, comprising:

a motion detecting device configured to detect motion from a user, the motion detecting device comprising:
   a housing comprising an interior cavity, the exterior of the housing comprising a detection surface, the detection surface comprising at least one lens and lighting detector that detects the amount of light passing through the at least one lens, the exterior of the housing further comprising a mounting surface, the housing further comprising a sensory control member for detecting motion in proximity to the motion detecting device, the housing further comprising at least one switch member, the housing further comprising at least one socket member, the housing further comprising at least one power source; and wiring and
   at least one light stream operatively connected to the at least one socket member,
wherein the socket member is disposed in an exterior surface of the housing such that the sensory control member and the socket member further connect to provide power from the power source to illuminate the at least one light stream when the light stream is connected to the socket member and motion is detected by the sensory control member,
wherein the switch member is disposed on an exterior surface of the housing in operative connection with the lighting detector, wherein the switch member comprises predetermined settings of level of light detection for the lighting detector and operation time of the light stream, wherein the light stream is operatively connected to the motion detecting device such that detection by the lighting detector of a level of light that passes through the at least one lens above a predetermined level as determined by the setting of the switch member prevents operation of the light stream regardless of the operation of the sensory control member, wherein the motion detecting device further comprises a sensor configured to receive remote signals, wherein the motion detecting device yet further comprises a programmable processor responsive to remote signals received by the sensor to control the sensory control member to be turned on or turned off; to program the amount of time of illumination of the light stream; and to program the play of music or other sounds under control of the sensory control member, wherein the sensor receives remote signals by way of wireless technology, wherein the mounting surface of the motion detecting device is mounted to a surface area proximal to the plumbing fixture.

2. The motion actuated fixture illuminator of claim 1, wherein the fixture comprises an outdoor fixture.

3. The motion actuated fixture illuminator of claim 1, wherein the plumbing fixture comprises a toilet, a sink, a bathtub, a bidet, a urinal, a water fountain or a shower.

4. The motion actuated fixture illuminator of claim 1, wherein the sensory control member of the motion detecting device comprises an acoustic sensor, an optical sensor, an infrared sensor, a video image processor, a magnetic sensor, a magnetometer, an infrared laser sensor, a microwave radar sensor, an inductive-loop detector, a triboelectric sensor, a seismic sensor, or an inertia-switch sensor.

5. The motion actuated fixture illuminator of claim 4, wherein the infrared sensor is sensitive to activation by detection of a temperature of about 93 degrees Fahrenheit.

6. The motion actuated fixture illuminator of claim 1, further comprising a source of sound in electrical connection with the sensory control member, wherein activation of the sound source is controlled by the sensory control member.

7. The motion actuated fixture illuminator of claim 1, wherein the light stream is configured to turn off after it has been active for a predetermined amount of time.

8. A method of illuminating the proximal area of a plumbing fixture, comprising:
    detecting motion by a motion detecting device;
    activating an illumination device upon detection of motion by the motion detecting device;
    thereupon illuminating the proximal area of a plumbing fixture; and
    thereafter turning the illumination device off after it has been activated for a predetermined amount of time,
    wherein the motion detecting device comprises
        a housing comprising an interior cavity, the exterior of the housing comprising a detection surface, the detection surface comprising at least one lens and lighting detector that detects the amount of light passing through the at least one lens, the exterior of the housing further comprising a mounting surface, the housing further comprising a sensory control member for detecting motion in proximity to the motion detecting device, the housing further comprising at least one switch member, the housing further comprising at least one socket member, the housing further comprising at least one power source; and wiring and at least one light stream operatively connected to the at least one socket member,
    wherein the socket member is disposed in an exterior surface of the housing such that the sensory control member and the socket member further connect to provide power from the power source to the at least one light stream when the light stream is connected to the socket member and motion is detected by the sensory control member to enable the light stream to provide illumination,
    wherein the switch member is disposed on an exterior surface of the housing in operative connection with the lighting detector, wherein the switch member comprises predetermined settings of level of light detection for the lighting detector and operation time of the light stream,
    wherein the light stream is operatively connected to the motion detecting device such that detection by the lighting detector of a level of light that passes through the at least one lens above a predetermined level as determined by the setting of the switch member prevents operation of the light stream regardless of the operation of the sensory control member,
    wherein the motion detecting device further comprises a sensor configured to receive remote signals, wherein the motion detecting device yet further comprises a programmable processor responsive to remote signals received by the sensor to control the sensory control member to be turned on or turned off; to program the amount of time of illumination of the light stream; and to program the play of music or other sounds under control of the sensory control member, wherein the sensor receives remote signals by way of wireless technology.

9. The method of claim 8, wherein the fixture comprises an outdoor fixture.

10. The method of claim 8, wherein the plumbing fixture comprises a toilet, a sink, a bathtub, a bidet, a urinal, a water fountain or a shower.

11. The method of claim 8, wherein the sensory control member of the motion detecting device comprises an acoustic sensor, an optical sensor, an infrared sensor, a video image processor, a magnetic sensor, a magnetometer, an infrared laser sensor, a microwave radar sensor, an inductive-loop detector, a triboelectric sensor, a seismic sensor, or an inertia-switch sensor.

12. The method of claim 11, wherein the infrared sensor is sensitive to activation by detection of a temperature of about 93 degrees Fahrenheit.

13. The method of claim 8, further comprising a source of sound in electrical connection with the sensory control member, wherein activation of the sound source is controlled by the sensory control member.

14. A motion actuated fixture illuminator configured to control the illumination of a proximal area of a plumbing fixture after a user is detected, comprising:
    a motion detecting device configured to detect motion from a user, the motion detecting device comprising a housing,
    a housing comprising an interior cavity, the exterior of the housing comprising a detection surface, the detection surface comprising at least one lens and lighting detector that detects the amount of light passing through the at least one lens, the exterior of the housing further comprising a mounting surface, the housing further comprising a sensory control member for detecting motion in proximity to the motion detecting device, the housing further comprising at least one switch member, the housing further comprising at least one socket member, the housing further comprising at least one power source; and wiring and
at least one light stream operatively connected to the at least one socket member,
wherein the socket member is disposed in an exterior surface of the housing such that the sensory control member and the socket member further connect to provide power from the power source to the at least one light stream when the light stream is connected to the socket member and motion is detected by the sensory control member to enable the light stream to provide illumination,
wherein the switch member is disposed on an exterior surface of the housing in operative connection with the lighting detector, wherein the switch member comprises predetermined settings of level of light detection for the lighting detector and operation time of the light stream,
wherein the light stream is operatively connected to the motion detecting device such that detection by the lighting detector of a level of light that passes through the at least one lens above a predetermined level as determined by the setting of the switch member prevents operation of the light stream regardless of the operation of the sensory control member,
wherein the sensory control member of the motion detecting device comprises an acoustic sensor, an optical sensor, an infrared sensor, a video image processor, a magnetic sensor, a magnetometer, an infrared laser sensor, a microwave radar sensor, an inductive-loop detector, a triboelectric sensor, a seismic sensor, or an inertia-switch sensor;
wherein further the light stream comprises a plurality of interchangeable covers configured to display various patterns upon illumination;
wherein further the motion detecting device comprises a source of sound in electrical connection with the sensory control member, wherein activation of the sound source is controlled by the sensory control member;
wherein further the motion detecting device comprises a sensor configured to receive remote signals, wherein the motion detecting device yet further comprises a programmable processor responsive to remote signals received by the sensor to control the sensory control member to be turned on or turned off; to program the amount of time of illumination of the light stream; to program the play of music or other sounds under control of the sensory control member; or any combination thereof, wherein the sensor receives remote signals by way of wireless technology.

* * * * *